United States Patent [19]
Ablay et al.

[11] Patent Number: 6,002,941
[45] Date of Patent: Dec. 14, 1999

[54] METHOD AND APPARATUS FOR IMPLEMENTING A SERVICE IN A WIRELESS COMMUNICATION SYSTEM

[75] Inventors: Sewim F. Ablay, West Dundee, Ill.; Armando Vera, Fort Worth, Tex.

[73] Assignee: Motorola, Inc., Schaumburg, Ill.

[21] Appl. No.: 08/992,612

[22] Filed: Dec. 17, 1997

[51] Int. Cl.$^6$ ....................................... H04B 7/26
[52] U.S. Cl. .......................................... 455/518; 455/508
[58] Field of Search ..................... 455/507, 508, 455/518, 519, 520, 521, 418, 420, FOR 113, FOR 114, FOR 115; 379/201, 207, 230

[56] References Cited

U.S. PATENT DOCUMENTS

| | | | |
|---|---|---|---|
| 5,315,646 | 5/1994 | Babson, III et al. | 379/201 |
| 5,323,452 | 6/1994 | Dickman et al. | 379/201 |
| 5,325,481 | 6/1994 | Hunt | 395/159 |
| 5,345,380 | 9/1994 | Babson, III et al. | 364/400 |
| 5,414,408 | 5/1995 | Berra | 340/525 |
| 5,481,601 | 1/1996 | Nazif et al. | 379/207 |
| 5,497,500 | 3/1996 | Rogers et al. | 395/800 |
| 5,551,041 | 8/1996 | Beethe | 395/733 |
| 5,802,159 | 9/1998 | Smolentzov et al. | 379/201 |
| 5,812,533 | 9/1998 | Cox et al. | 370/259 |

*Primary Examiner*—Thanh Cong Le
*Assistant Examiner*—Thomas B. Ahn
*Attorney, Agent, or Firm*—Susan L. Lukasik

[57] ABSTRACT

In a wireless communication system (100, 200), at least one service building block (605–610 and 622) is used in a service creation environment (301) to create logic program rules (303) that include identification of an authorized service execution environment. The logic program rules, which may require further configuration, are provided to a service execution environment (302) having an identification that matches the identification of the authorized service execution environment. Configurable software modules within the service execution environment are executed in accordance with the logic program rules when at least one predetermined stimulus is detected, thereby providing the service within the system. The service creation environment and the service execution environment may be implemented within a single console or separately implemented within different consoles, or the service creation environment can be embodied within a stand-alone computer (201). In this manner, rapid service creation is provided.

26 Claims, 6 Drawing Sheets

METHOD AND APPARATUS FOR IMPLEMENTING A SERVICE IN A WIRELESS COMMUNICATION SYSTEM

FIELD OF THE INVENTION

The present invention is generally related to wireless communication systems and, in particular, to a method and apparatus for implementing a service in a wireless communication system.

BACKGROUND OF THE INVENTION

Wireless communication systems are well known in the art. Within such systems, a fixed infrastructure is used to provide a variety of services to wireless units (e.g., mobile and/or portable radios). In many systems, particularly conventional and trunked land mobile radio systems, the fixed infrastructure includes one or more consoles (or operator positions). A console allows a dispatch operator to coordinate communications among the wireless units, as well as to communicate with the wireless units. As an example of a service within a console-equipped system, a dispatch operator can create temporary talk groups (logical groupings of wireless units created for the purpose of group-wide communications) and exchange communications with members of the temporary talk group. The ability to creatte temporary talk groups (often referred to as "patch") is useful, for example, when responding to emergency conditions. A variety of other services akin to the creation of temporary talk groups are also commonly available, such as emergency alarm, emergency call, private conversation, and call alert.

However, the use of any given service is limited by the particular service logic available to the communication equipment that implements the service, e.g., the console. The software available to the equipment typically limits the use of services in that the services may not be modified to fit the needs of a particular user or to meet the needs of a given set of circumstances. Currently, whenever a new service is required by a user of a wireless system, the manufacturer of the wireless system must first engage in an expensive and time-consuming process of designing and testing the new service before providing the service to the user. As the sophistication of the new services increases, the cost, complexity and time required to provide such new services correspondingly increases. Although not currently possible, it is recognized that it would be desirable to allow new services to be implemented "on the fly" by users as the need for such new services become apparent.

Various standards bodies, such as the International Telecommunications Union (ITU-T), have made recommendations for the so-called Intelligent Network, and have begun to generally outline the concept of a "Rapid Service Creation Environment". Strides have been made in "rapid service creation" in the area of wireline networks, i.e., telephone networks. For example, U.S. Pat. Nos. 5,315,646 and 5,345,380 to Babson et al., 5,323,452 to Dicikman et al., and 5,481,601 to Nazif et al. illustrate various methods and apparatuses for the creation and provisioning of unique call services in telephone networks. In general, these patents describe a system in which a hardware interface (e.g., a computer with a display terminal) is provided that allows a user to manipulate abstract building blocks and thereby create, simulate and provide new telephone-based services. However, these techniques are limited to wireline environments.

Additionally, the services created using these techniques are not executable by the platform that is allowed to create them. That is, the actual execution of the newly created services must be distributed to other network entities, such as telco switches and service control points. This is a suitable limitation in a telephone system comprising a large number of processing devices. However, such a distributed implementation is not cost-scaleable to smaller, wireless communication systems in which there is a relatively small number of processing devices within the fixed infrastructure. Furthermore, a limitation of wireless communication systems is the presence of noise, interference and other factors that limit performance within the system. The presence of these limiting factors, not otherwise found in wireline systems, gives rise to special processing needs such as message retries and exception handling. In view of these limitations of the prior art and the circumstances typically arising in wireless systems, there exists a need for techniques that provide rapid service creation in wireless communication systems.

DESCRIPTION OF THE PREFERRED EMBODIMENT

The present invention provides a method and apparatus for implementing a service in a wireless communication system. A service creation environment is used to create logic program rules based on at least one service building block. The logic program rules include identification of an authorized service execution environment. Any of the at least one service building block used in the logic program rules can be configured to be responsive to at least one predetermined stimulus. Each time that the logic program rules for a service are invoked in the execution environment by receipt of the predetermined stimulus is termed an "instance" of the service. Similarly, the "termination" or de-invocation of a service instance may occur each time that another particular stimulus is received by the execution environment. Further, multiple invocations and terminations of service logic of the type to be described are also possible, depending upon both the service logic rules (the actual interconnection of the service building blocks at creation time) and the actual stimuli that are received at service execution time. Additionally, any of the service building blocks can be configured so that input information is passed to an output port without further processing when the service building block transitions from a WAIT state to a SKIP state, and then to an EXECUTE state. The logic program rules, which may require further configuration, are provided to a service execution environment having an identification that matches the identification of the authorized service execution environment. Configurable software modules within the service execution environment are executed in accordance with the logic program rules when the at least one predetermined stimulus is detected, thereby providing the service within the system. The service creation environment and the service execution environment may be implemented within a single console or separately implemented within different consoles. Alternatively, the service creation environment can be embodied within a stand-alone computer. In this manner, the present invention allows for rapid service creation in a wireless communication system, particularly where one or more consoles are used.

Figure 1:
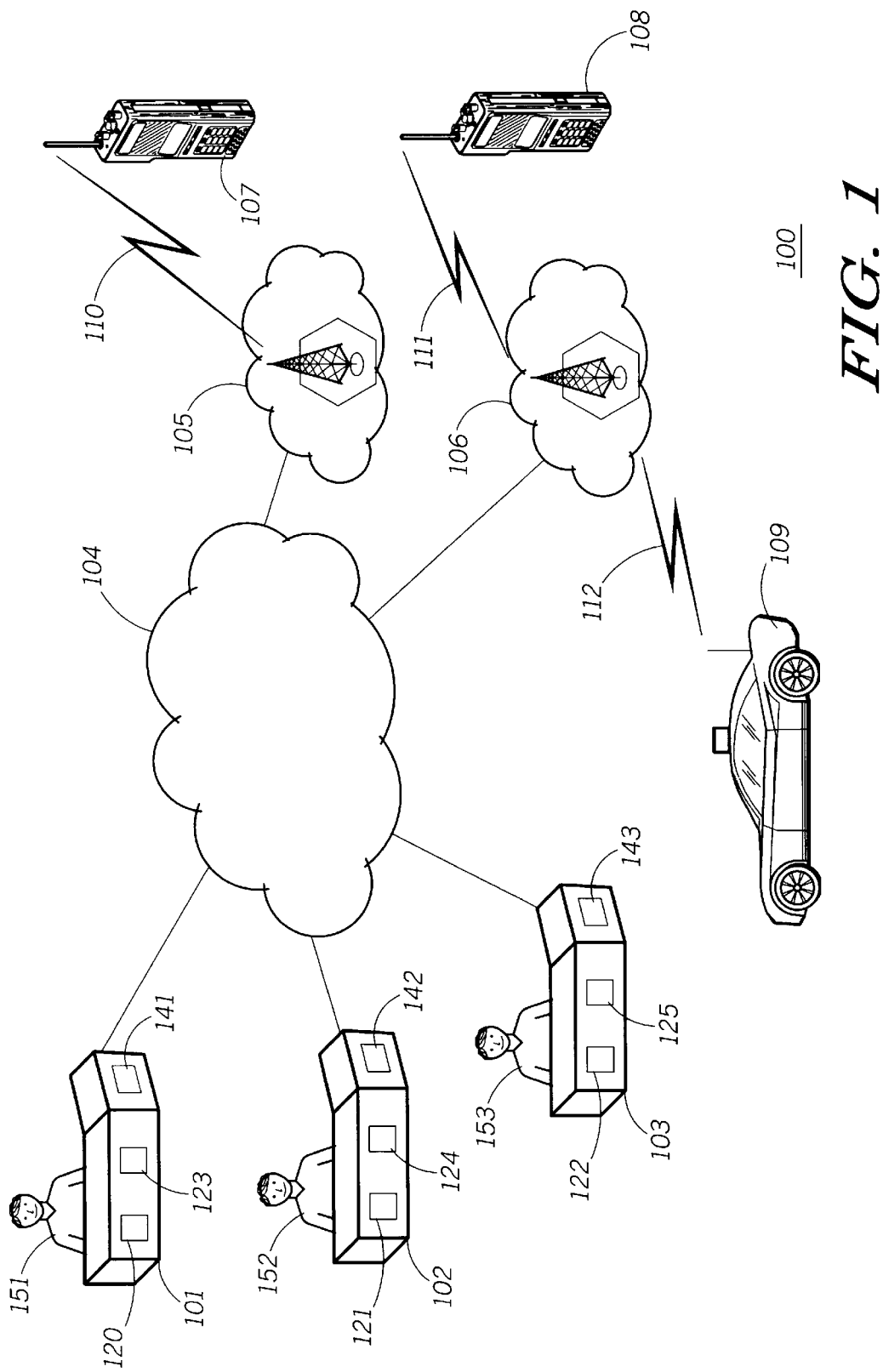
FIG. 1 is a block diagram of an embodiment of a wireless communication system in accordance with the present invention.

Further understanding of the present invention may be gained with reference to FIGS. 1–9. FIG. 1 illustrates a wireless communication system 100 comprising consoles 101–103, a network 104, wireless base sites 105–106, and wireless units 107–109. In general, the wireless communication system 100 may comprise any console-equipped conventional or trunked system, specific examples of which include, but are not limited to, public safety systems (e.g. police, fire, paramedic) and other dispatch-oriented systems such as those operated by pipeline and taxicab companies. As shown, the wireless units 107–103 can be in-hand portable and/or in-car mobile radios capable of communicating with the wireless base sites 105–106 and each other via wireless communication resources 110–112. The network 104 is capable of high-speed voice and/or data transfers between any of the consoles 101–103, wireless base sites 105–106, or any other type of fixed infrastructure equipment capable of such voice and/or data communications. Examples of suitable networks 104 (such as those used with the CENTRACOM™ series of consoles manufactured by Motorola, Inc.) include leased telephone lines, microwave links, and T1/E1 lines. The network 104 typically also comprises a plurality of audio/data switches and routers, e.g., Central Electronics Banks (CEB), Trunking Central Controllers (TCC), and Zone Controllers (ZC) manufactured by Motorola, Inc.

Each of the consoles 101–103 includes at least one computing device 120–122 (e.g., a microcomputer, a microcontroller, a digital signal processor, or combination of these or similar devices) and corresponding memory 123–125 configured, as known in the art, to allow the execution of stored software routines. Further, each of the consoles 101–103 includes a dispatcher user interface (DUI) 141–143 that is presented to a console user 151–153 for communication with units in the field. Via the DUI, the console user is also made aware of the service and other capabilities supported by the console. A suitable platform for each console 101–103 is a Centracom™ Gold series console manufactured by Motorola, Inc. As described below, these consoles rely on an internal application programming interface (API) that provides access to the service execution environment and to radio communication resources for implementation of the service creation environment services. Using the data network 104, each console 101–103 is capable of communicating with the other consoles 101–103 and, in the preferred embodiment, each console may send or receive logic program rules, as described below. Alternatively, the consoles 101–103 may communicate with each other directly via links (not shown) which bypass the network 104.

Figure 2:
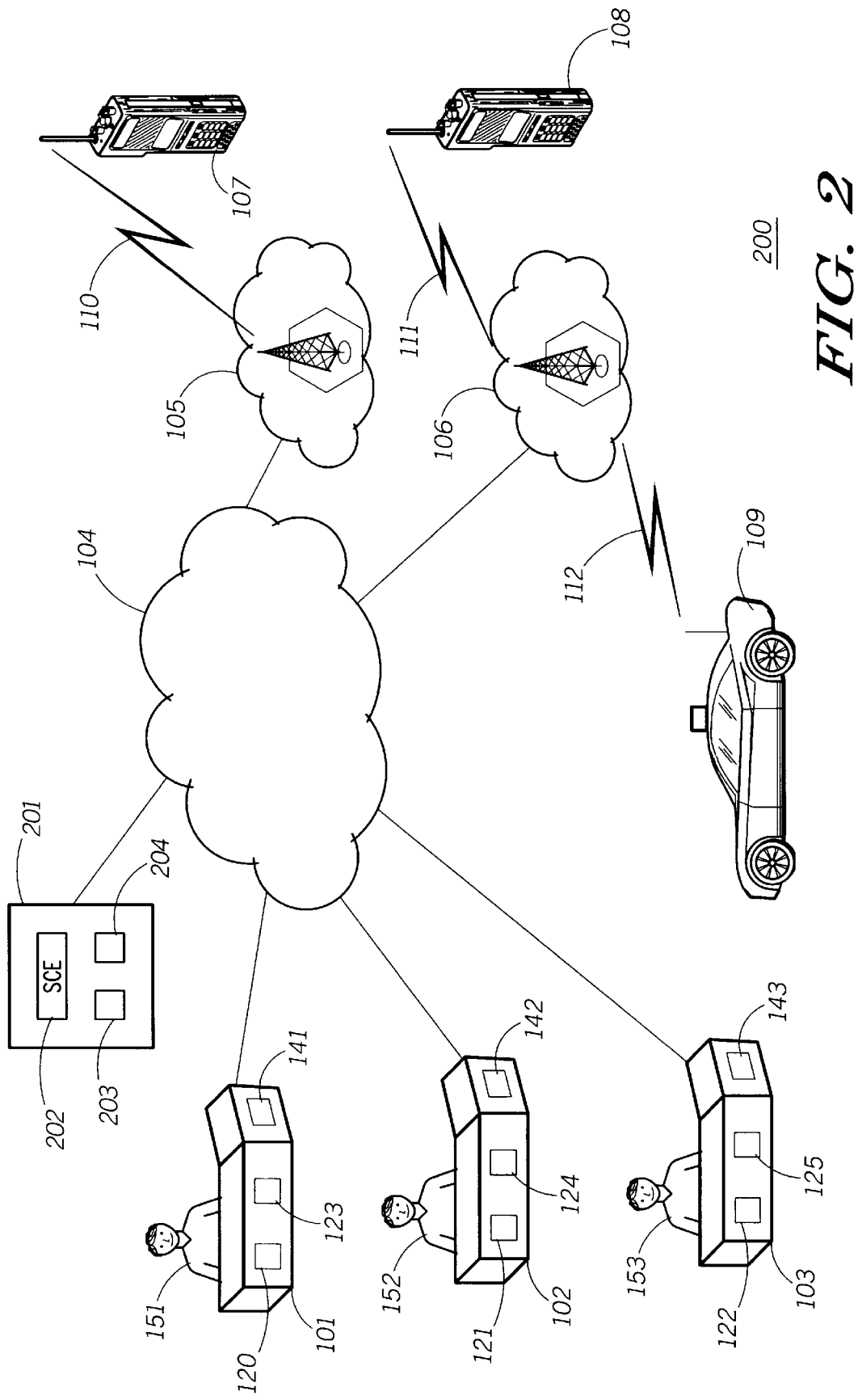
FIG. 2 is a block diagram of another embodiment of a wireless communication system in accordance with the present invention.

An alternate configuration for a suitable wireless communication system 200 is shown in FIG. 2. The wireless communication system 200 is essentially equivalent to that shown in FIG. 1, with the addition of a stand-alone computer 201. The stand-alone computer 201 comprises at least one computing device 203 and memory 204 which can be used to provide a service creation environment 202. (During initial testing of the present invention, a personal computer running a Windows NT operating system and having 32 Mbytes of random access memory and a processor clock rate of 100 MHz was used to provide the service creation environment.) In this configuration of the system 200, the stand-alone computer 201 communicates with the consoles 101–103 via i the network 104 and, in particular, the stand-alone computer 201 sends logic program rules, generated via the service creation environment 202, to any of the consoles 101–103, presuming that the consoles 101–103 are authorized. Alternatively, the stand-alone computer 201 may also communicate with the consoles 101–103 via direct links (not shown) that bypass the network 104.

Figure 3:
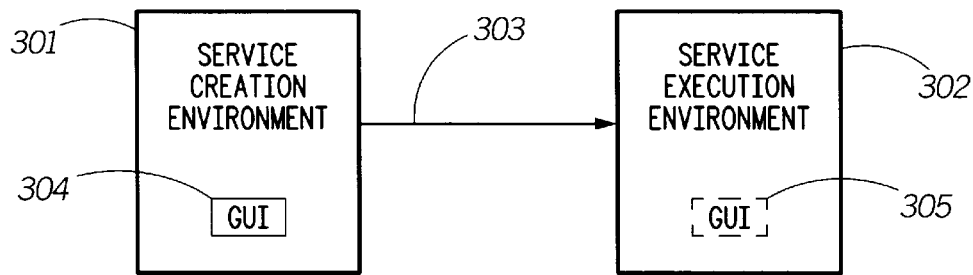
FIG. 3 is a block diagram of an apparatus for implementing services in a wireless communication system in accordance with the present invention.
Figure 4:
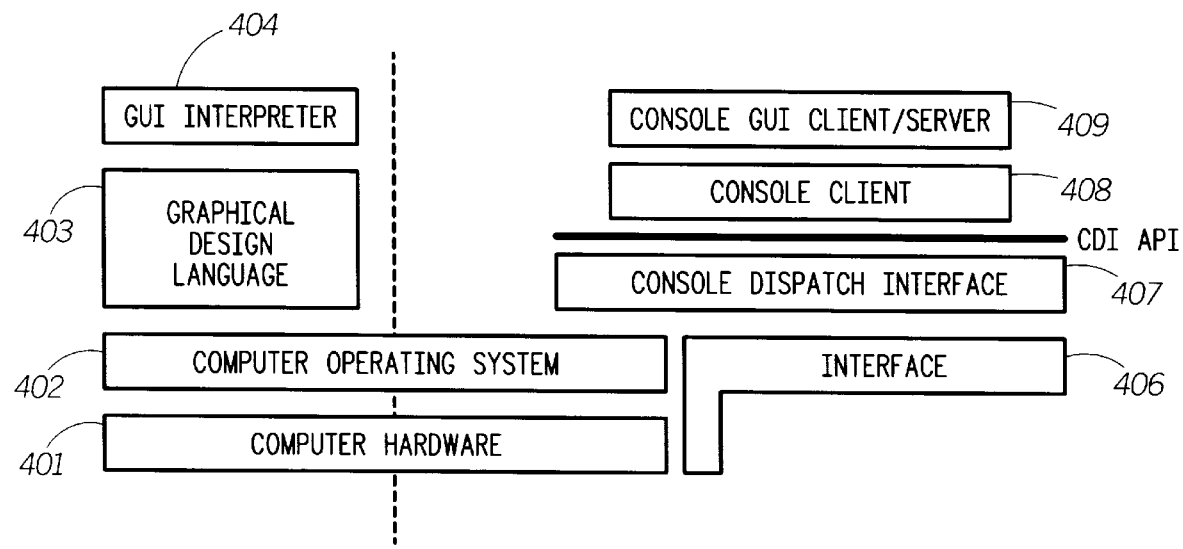
FIG. 4 is a block diagram illustrating a hierarchical software and hardware implementation of a console in accordance with the present invention.

The general concept of a service creation environment and service execution environment is illustrated in FIGS. 3 & 4. Referring to FIG. 3, a service creation environment 301 is shown in communication with a service execution environment 302. More particularly, the service creation environment 301 provides logic program rules 303 to the service execution environment 302. Additionally, the service creation environment 301 is informed of the current version and capabilities of the logic program rules 303 that are currently deployed to the service execution environment 302. In general, the service creation environment 301 is a combination of hardware and software elements that allow for the creation and management of communication system services. To this end, the service creation environment 301 preferably includes a graphical user interface 304, as known in the cart, to allow interaction with a user for the creation of services. In the preferred embodiment, the service creation environment 301 is embodied by a single console or stand-alone computer, as illustrated in FIGS. 1 and 2. In the case of a single console, the graphical user interface 304 is used for the DUI, discussed above. Examples illustrating use of a service creation environment in accordance with the present invention will be discussed with reference to FIGS. 5–8 below.

Similar to the service creation environment 301, the service execution environment 302 is a combination of software and hardware elements configured so as to allow the execution of configurable software modules in accordance with the logic program rules created within the service creation environment 301. In the preferred embodiment, the service execution environment 302 is embodied by the same console used to implement the service creation environment 301, although it is anticipated that the service execution environment 302 could be embodied in another console physically separate from the console or stand-alone computer used to implement the service creation environment 301. Additionally, the service execution environment 302 may optionally include a graphical user interface 305. When the service creation and execution environments 301–302 are embodied in a single console, the respective graphical user interfaces 304–305 may be embodied in a single graphical user interface. Regardless, the service execution environment 302 has sufficient connectivity with the remainder of the wireless communication system of which it forms a part to allow a service (as embodied by the logic program rules) to be provided when needed.

FIG. 4 illustrates a hierarchical software arid hardware implementation of a console in accordance with the present invention. The architecture shown describes a single console encompassing both a service creation environment (to the left of the dotted line) and a service execution environment (to the right of the dotted line). It is understood that the respective service creation and service execution environments could be implemented completely independent of each other by splitting the architecture along the dotted line. In such a case, separate computer hardware 401 and computer operating systems 402, in communication with each other, would be provided at the bottom of the hierarchy.

The computer hardware 401 may comprise a commonly available computer platform having sufficient memory, speed and input/output capabilities. For example, the computer hardware 401 may comprise a personal computer. Alternatively, the computer hardware 401 may comprise a customized, microprocessor-based platform designed solely for operation within a wireless communication system, e.g., VME-based platforms manufactured by Motorola, Inc. At a minimum, the computer operating system 402 must provide interoperability between the higher-level applications and the underlying computer hardware 401. When a commonly-available computer platform is used, the corresponding computer operating system 402 comprises the operating system resident on such a platform, e.g., the well-known Windows NT Operating System or similar operating system.

Within the service creation portion of the architecture, a graphical design language 403, such as the well-known Visual Basic design language, is provided. The graphical user interface (GUI) interpreter 404 supports an interface to the human service designer, i.e., a GUI (not shown), and an interface to the graphical design language 403. Via the human designer interface, the GUI interpreter 404 allows the human designer to select and manipulate graphically-represented service building blocks (often referred to as SIBs in the art and used interchangeably hereinafter), to designate interconnections between SIBs, to specify the type of invocation of linked SIBs, and to configure parameters within SIBs, all as discussed in greater detail below.

Operating in conjunction with the graphical design language 403, the GUI interpreter 404 creates a data base embodying editable, logic program rules. in particular, the data base includes topology information necessary to recreate the graphical representation of the service at a later time, information needed by each SIB in order to provide the service, and information that keeps track of the logical overall execution sequence of the SIBs, all of which is known in the art. Thus, when logic program rules are passed between the service creation environment and the service execution environment, they are embodied in a database passed between the two. Additionally, each set of logic program rules includes identification of one or more authorized service execution environments. As described below, only authorized service execution environments are allowed to receive the logic program rules, and subsequently implement the service embodied therein.

Within the service execution portion of the architecture, a console GUI client/server 409 and a console client 408 are provided. The console GUI client/server 409 is a software-based process that interfaces with the console operator/service designer (e.g., operators 151–153 in FIG. 1). Configurable software modules reside within the console GUI client/server 409 that may be invoked and executed in accordance with logic program rules. Thus, based on the logic program rules and input from the console operator/service designer, the console GUI client/server 409 transceives function call messages with the console dispatch interface (CDI) 407 via the CDI application programming interface (API) (shown as the heavy line between the console client 408 and CDI 407). The CDI API serves as a standardized interface allowing a wide variety of applications to exchange function call messages with the CDI 407. The console client 408 is a software application that allows a higher-level process (i.e., the console GUI client/server 409) to communicate with the CDI 407. Although shown separately in FIG. 4, it is possible that the console client 408 could be incorporated directly into the console GUI client/server 409. The CDI 407, which manages communications with other elements of the network 104 (i.e., CEB, TCC, ZC, etc. as known in the art), essentially acts as a router in that it routes messages received via the CDI API to the appropriate element within the network 104, and vice versa. In this manner, the logic program rules effectively implement services within a wireless network in that various elements of the wireless network are controlled thereby.

As described above, the console GUI client/server 409 receives logic program rules. Additionally, the console GUI client/server 409 is also capable of receiving "incomplete" logic program rules that can be customized based upon the needs of each console position or operator. In this manner, services embodied by logic program rules may be customized for each console operator as needed. Further discussion regarding such customization is presented below.

Figure 5:
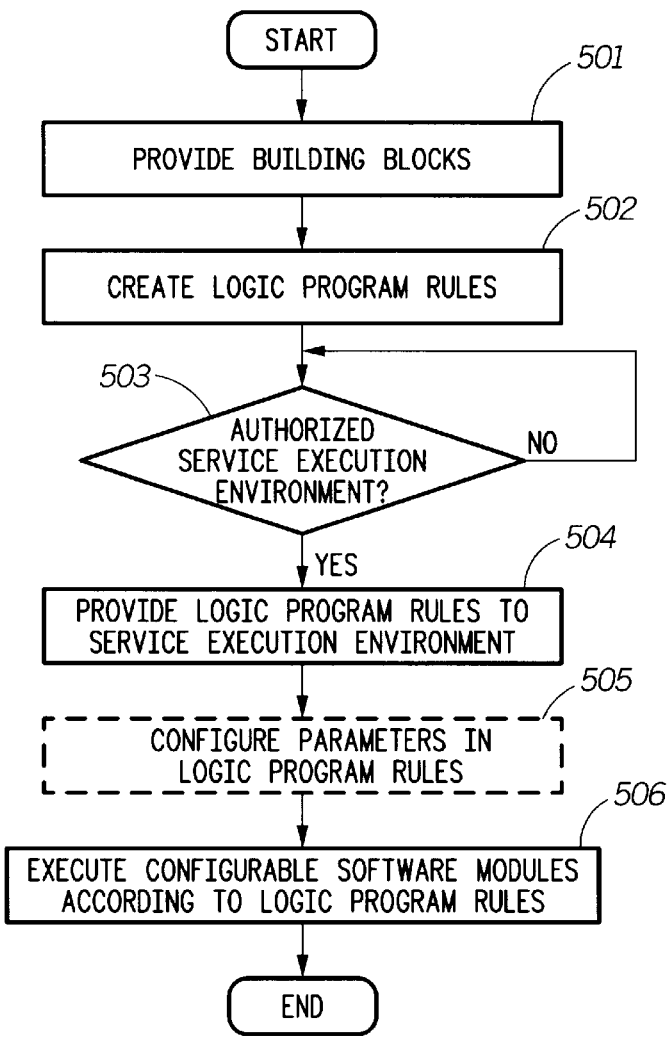
FIG. 5. is a flowchart illustrating a method for implementing services in a wireless communication system in accordance with the present invention.

FIG. 5 illustrates the use of a service creation environment and service execution environment in order to implement a service in a wireless communication system. At step 501, a plurality of service building blocks are provided within the service creation environment. Service building blocks are abstract entities that have different meanings depending upon their usage context. For example, a service designer, operating within a service creation environment, views each service building block, or SIB, as an abstract, graphical representation of a service primitive. Within the service execution environment, on the other hand, SIBs and their embodiment are viewed as logic rule components that can be executed. SIBs are defined by the International Telecommunications Union in four usage contexts, only three of which are relevant to the present discussion. Within ITU's first usage context, Recommendation Q.1203, entitled "IN Global Functional Plane Architecture" for the Intelligent Network, a SIB is a standard, reusable network-wide capability residing in an abstract view of the netNork that describes service features. SIBs can be connected together in various combinations to realize service logic (logic program rules). The Global Functional Plane is a portion oF the overall abstract behavioral representation of network functionality. Outside of the Global Functional Plane and within the Distributed Functional Plane (as defined by ITU Recommendation Q.1204, entitled "Distributed Functional Plane Architecture"), SIBs are viewed as distribuled, communicating entities. Finally, in ITU's embodiment as elements that are implemented in the Physical Plane (as defined by ITU Recommendation Q.1215, entitled "Physical Plane Architecture for IN Capability Set 1"), SIBs are viewed as one or more software processes within an execution environment. An example of service logic in the Global Functional Plane would be a behavioral representation of communicating finite state machines as described using the Specification and Description Language (SDL) as found in the ITU-T's Z.100-series of Recommendations. Examples of various generic SIBs (primarily for use in wireline networks) are defined by the ITU-T Recommendation on Intelligent Networks, Q.1213, entitled "Global Functional Plane for Intelligent Network CS-1".

Figure 6:
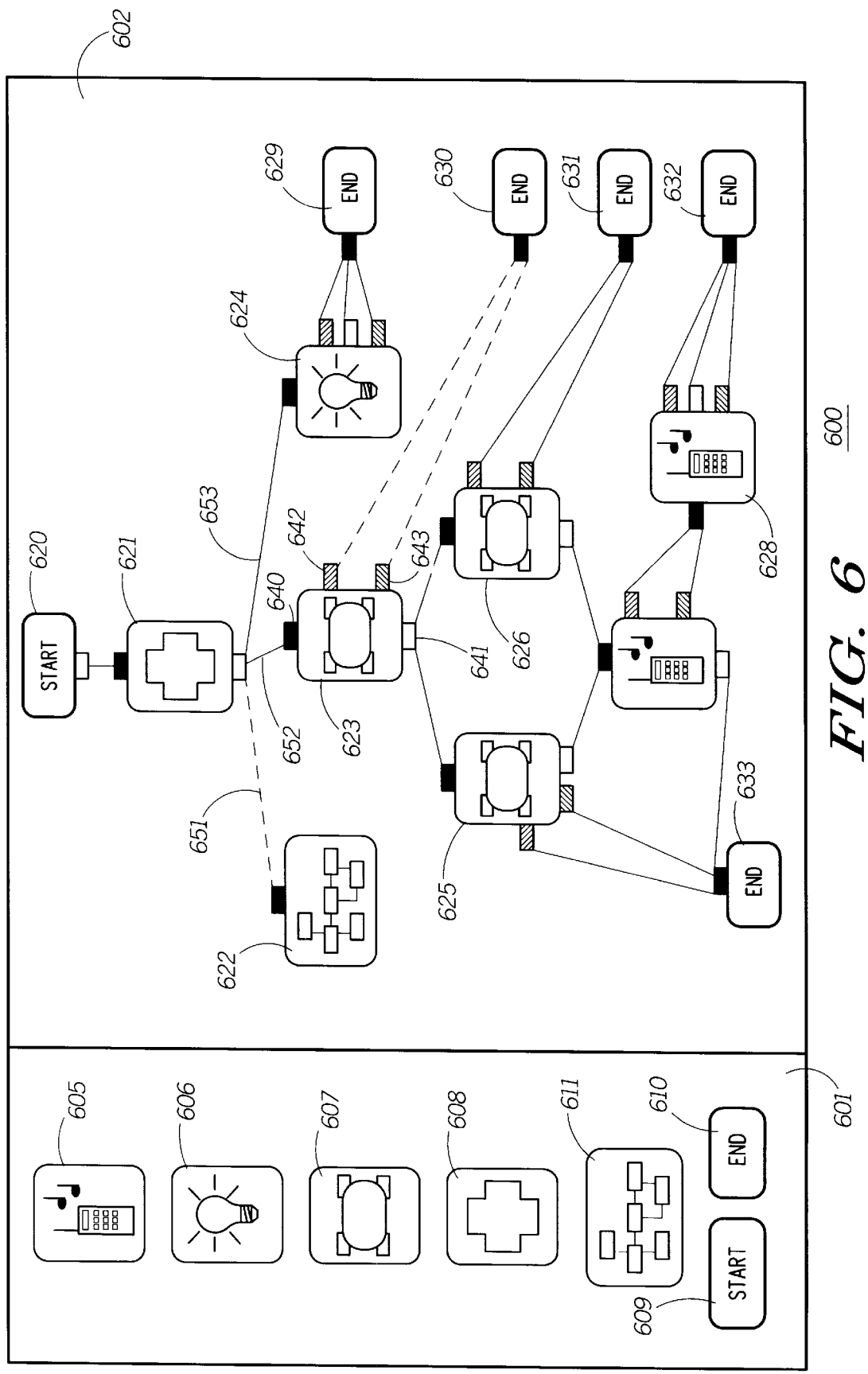
FIG. 6 illustrates an exemplary display that includes a service palette and a programming area to be used for creating logic program rules in accordance with the present invention.

Examples of service building blocks for use ir accordance with the present invention are shown in FIG. 6 and discussed below. These SIBs are unique in comparison with the capabilities foreseen by the aforementioned ITU-T SIBs in that they encompass additional processing relating to radio system exception handling (e.g., channel re-transmission algorithms and timers) required to implement a reliable radio channel. Another distinction relative to ITU-T SIBs is that SIBs used in the present invention are much less primitive and are closer to implementing the higher level capabilities of ITU-T service features. As defined by ITU-T, a "service feature" is the smallest capability that is marketable and recognized by an end user of a service. Additionally, each of the SIBs used in the present invention are preferably categorized into one of several categories of states (execute, wait, & skip) as described below.

Returning to FIG. 5, at step 502, logic program rules are created based on at least one service building block. Logic program rules represent the logic required to define and implement the service and, in the preferred embodiment, are embodied in a database that is descriptive of a graphical or topological representation of multiple service building blocks having linked inputs and outputs. The logic program rules associated with the configurable software modules are derived by creating a state machine representation or specification of the logic. This requires, in part, knowing the default state of each building block, which is initialized during the graphical creation of the service logic, as described in greater detail in conjunction with FIG. 8, below. Also required is a representation of all possible states that both the individual building blocks and the logic program constructed with at least one of these building blocks may traverse. The allowable building block states and transitions are described below in conjunction with FIG. 9. The state description for the overall service logic rules derives from the graphical interconnection of all of the building blocks. From this state representation, the next state that the logic will need to pass through, at a particular execution point, can be determined, as required, by the execution environment. Additionally, any given set of logic program rules may include a graphical representation of a different set of logic program rules linked to service building blocks within the given logic program rules. Regardless, each set of logic program rules is designed to provide a service within the wireless communication system to the extent that such service can be implemented using the functionality of the service building blocks (and other sets of logic program rules). The use of a graphical design language makes the creation of logic program rules (i.e., the databases that describe the interconnections between building blocks and the configurations of individual building blocks) a much quicker and simpler task in comparison to well-known software coding techniques.

The service logic rules to be defined at step 502 for the service example discussed below will be advantageously constructed using two counterpart services rather than by a single monolithic structure. A first set of service logic rules ("Invoke Service") will define the necessary logic to activate an instance of the particular service chain. A second set of service logic rules ("De-invoke Service") will define the logic necessary to de-activate an instance of the first service chain. The two sets of logic rules will then be made available to the execution environment.

As described in greater detail below, creation of logic program rules may involve complete or partial configuration of all parameters related to that service. When all parameters are configured at this stage, the logic program rules later provided to the service execution environment will require no additional configuration prior to providing the service. Alternatively, when configuration of the parameters for the service is only partial, additional configuration will be needed after the logic program rules have been provided to the service execution environment. The ability of the present invention to provide "incomplete" logic program rules allows for the customization of services.

When creating logic program rules, the present invention allows for the configuration of individual service building blocks. An aspect of this feature is the ability to configure at least one service building block (forming a part of a larger set of logic program rules) to be responsive to at least one predetermined stimulus. For the purposes of the present invention, a predetermined stimulus can be any manifestation of any entity or event within the wireless communication system, the existence of which can ultimately be indicated to the service execution environment. (In the embodiment depicted in FIG. 4, such manifestation would take the form of a message passed via the CDI.) The transmission or reception of a wireless unit identification (i.e., identification of a single mobile/portable radio) or wireless group identification (i.e., identification of a talk group) are examples of manifestations of entities within the wireless communication system. The transmission or reception of a voice/data message or a status message, as known in the art, are examples of manifestations of events within the wireless communication system. It is to be understood that the preceding are not a complete definition of a predetermined stimulus, but rather specific examples of predetermined stimuli.

Any logic program rules created at step 502 will also include identification of at least one authorized service execution environment. An authorized service execution environment is any service execution environment which is allowed to receive the logic program rules and provide the service embodied therein. In this manner, services may be selectively provided within the wireless communication system. In the preferred embodiment, authorized service execution environments are identified by a predetermined identification code, such as a console identification.

Once the logic program rules have been created, authorized service execution environments are identified at step 503 and, if identified, the logic program rules are sent (i.e., the service is provisioned) to such service execution environments at step 504. There are various ways in which this can be achieved. In one method, the logic program rules can be automatically provided to the authorized service execution environment(s) as identified by the logic program rules. For example, a first console 101 or stand-alone computer 201, functioning as the service creation environment, would automatically send the logic program rules to the authorized service execution environments (consoles) 102–103. In another method, the service creation environment first notifies only the authorized service execution environments that the logic program rules for a given service are available. The service creation environment will send the logic program rules to a given authorized service execution environment only after receiving a request, from the given authorized service execution environment, to do so. It is understood that other methods for providing the logic program rules to authorized service execution environments could be devised by those having ordinary skill in the art. Regardless, the action of provisioning the service causes the logic program rules to be installed in the service execution environment. Additionally, if a DUI is present, an indication of a new service is made apparent, e.g., by a new entry being added to a "pull-down" service menu in the DUI, or through the appearance of a new icon.

Having provided the logic program rules to the (authorized) service execution environment(s) at step 504, a limited set of parameters in the logic program rules may optionally require configuration at the service execution environments, at step 505. Logic cannot be altered, only the flow path through it. For example, data such as talk group IDs can be altered. Specific examples of configurable parameters will be described in conjunction with FIGS. 6–8, below.

At step 506, the service execution environment will cause the configurable software modules to be executed only upon detection of the at least one predetermined stimulus specified in the logic program rules. Assuming that the service creation environment is embodied in a console, the reception, for example, of a given wireless unit identification or status message would cause a particular configurable software module or modules to be executed by the console, thereby implementing the desired service.

As described above, the logic program rules for a given service, in the preferred embodiment, comprise a database that is descriptive of a graphical representation of multiple SIBs having linked inputs and outputs. In particular, the database may include a Master SIB that contains information regarding the sequence of SIBs that must be subsequently "executed" in order to provide the service within the wireless communication system. As described in greater detail below, a SIB, when signaled by the Master SIB, is provided with a data structure that includes: i) data contained in the current API Message that caused the SIB to be invoked, and ii) parameters stored by the SCE-GUI for that particular instance of the SIB.

Figure 7:
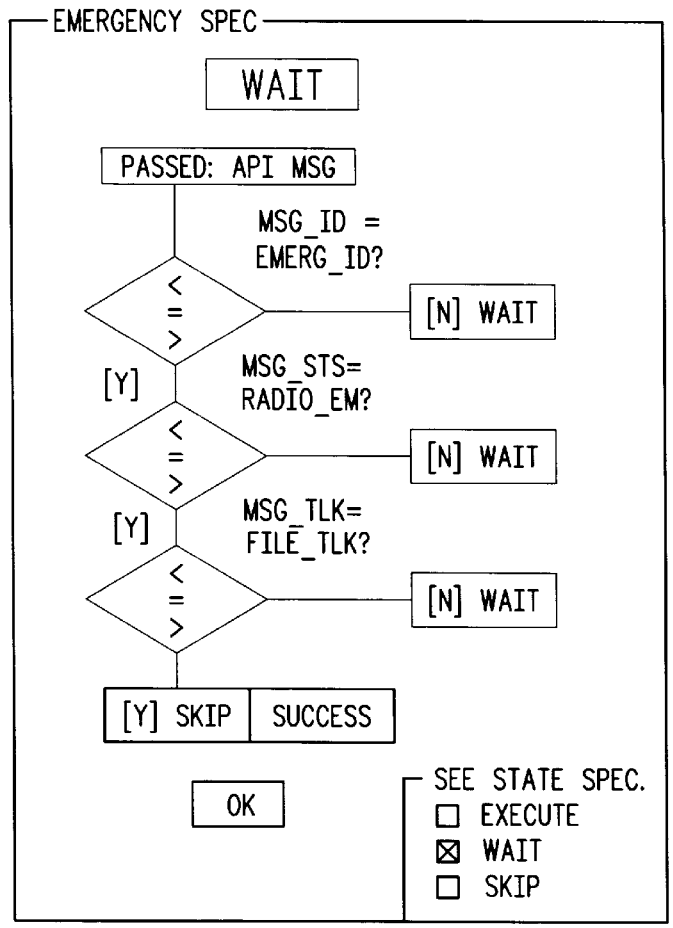
FIG. 7 illustrates an exemplary display of a service logic specification that includes a first set of configuration parameters corresponding to a service building block displayed within a service palette in accordance with the present invention.
Figure 8:
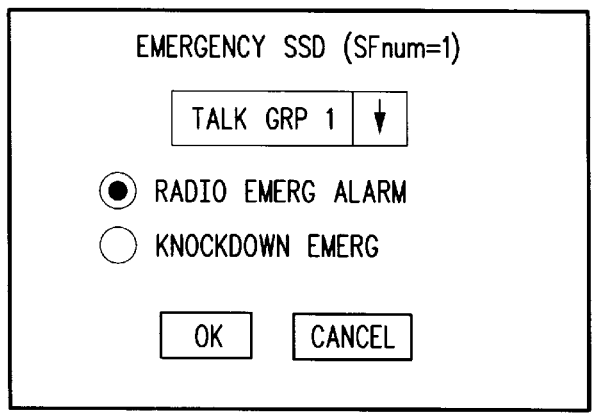
FIG. 8 illustrates an exemplary display of a dialog box used for a second set of configuration parameters corresponding to a service building block displayed within a programming area in accordance with the present invention.

Examples illustrating operation of the present invention are shown in FIGS. 6–8. FIG. 6 illustrates a display as would be seen on a graphical user interface 600 in accordance with the present invention. The display comprises two basic parts: a service palette 601 and a service programming area 602. The service palette 601 comprises a plurality of service building blocks 605–611. In this example, a "call alert" building block 605, an "auxiliary I/O" building block 606, a "talk group patch" building block 607, an "emergency alarm" building block 608, "start" and "stop" building blocks 609–610, and an EXTERNAL building block 611, are shown. Each of the service building blocks shown is representative of a service primitive available within the wireless communication system. The service building blocks 605–611 shown are representative only and are not intended to be exhaustive of the types of service building blocks that may be used.

An example of the construction and graphic representation of logic program rules comprising service building blocks 620–633 is shown within the service programming area 602. In the example of FIG. 6, all emergency alarm SIB 608, a talk group patch SIB 607, an auxiliary I/O SIB 606, a call alert SIB 605, and an EXTERNAL building block 611 have been linked together to accomplish the overall service functionality, as described according to the following requirements:

Requirement 1: Upon detecting an emergency-related predetermined stimulus as defined in the logic program rules, attempt to turn on a beacon-light, as might be found in a console dispatch position located at a public safety center or police department. If, during run-time an exception condition is encountered that prevents activation of the light, continue with other remaining service tasks.

Requirement 2: Invoke a first set of service logic rules that will attempt to patch together members of the talk group of the unit that originated the emergency stimulus. If the talk group associated with the initiating radio (i.e., the initiating talk group) cannot be patched, then terminate the service altogether. Otherwise, attempt to patch together two additional talk groups. If at least one of these two additional talk groups can be patched, then attempt to send a call alert message to a specified unit that is part of a specified talk group. If it is not possible to send the call alert to that unit, then attempt to send a call alert to an alternate unit in an alternate talk group.

Requirement 3: Activate a second set of service logic rules that will de-invoke the first set of service logic rules associated with Requirement 2.

In the preferred embodiment, a graphic representation of logic program rules is constructed by "dragging" or moving building blocks from the service palette 601 onto the programming area 602, thereby creating copies of the selected building blocks in the programming area 602 and causing appropriate data structures to be added to the database embodying the logic program rules. The START building block 609 is the initial building block to be utilized in constructing logic program rules. When placed in the programming area 602, the START building block 620 causes sufficient creation environment computer resources, such as file space and data structures, to be assigned to the new logic program rules being created. At least one instance of an END building block 610 is required to terminate logic program ruins being created.

When residing in the service palette 601, the underlying logic of each building block 605–608 may be accessed, resulting in a display illustrating the underlying logic. For example, by "double-clicking" on the emergency alarm building block 608, the display shown in FIG. 7 is shown. In one embodiment, the underlying logic may not be altered and is only shown for the convenience of the service designer. In the preferred embodiment, the flow through the underlying logic during execution, but not the logic itself may be altered by configuring a first set of parameters. In particular, the data (to be further defined in conjunction with FIG. 8, below) is configurable and initialized at creation time. The arrangement of the decision boxes and their respective decision criteria, as well as the actions conditioned on such decisions, are not configurable. As the configurations are made, they are stored in the database embodying the logic program rules. In the example of FIG. 7, the logic underlying the emergency alarm building block 608, upon receiving the appropriate message from the CDI API, assesses the truth of three separate conditions. Assuming all conditions are true, the SUCCESS output port (discussed later) is activated and the state of the building block changed to a SKIP state. If any of the conditions are not true, then the building block remains in a wait state. The SKIP and WAIT states are discussed in further detail below. Other displays corresponding to each building block in the service palette 601 similar to that shown in FIG. 7 are, of course, possible.

In a similar manner, when a building block is dragged to, or is accessed while residing in, the programming area 602, a dialog box appears prompting the service designer for information (i.e., a second set of parameters) that is appropriate for that particular building block as used in the service being created. In the preferred embodiment, the second set of parameters may be configured at the service design phase, or left unconfigured (or in a default state) for later configuration in the service execution environment. An example of such a dialog box for the emergency alarm building block 621 is illustrated in FIG. 8 where a check box entitled "Radio EMERG alarm", when selected, configures one type of operation (i.e., to initiate an emergency alarm) and where another check box entitled "Knockdown EMERG", when selected in the alternative, configures another type of operation (i.e., termination of emergency alarm operation). Additionally, a scroll list is provided for the selection of a talk group number. Configuration of talk group number information is an example of how "incomplete" service logic can be configured at a later time by the execution environment. The configurations, or lack thereof, are confirmed once the "OK" button is activated.

Each of the building blocks identified by reference numerals 605–608 and 611 (i.e., non-terminator building blocks), when used in the programming area 602, has an associated Input terminal port, shown as a black terminal ports (e.g., element 640 for the first talk group patch building block 623), for receiving a data structure as input. Data structures modified by execution of a building block are placed on one of a plurality of output terminal ports: a Success/Status terminal port, shown as white terminal ports (e.g., element 641 for the first talk group patch building block 623), an Error1 terminal port, shown as left-to-right descending diagonal terminal ports (e.g., element 642 for the first talk group patch building block 623), and Error2 terminal ports, shown as right-to-left descending diagonal terminal ports (e.g., element 643 for the first talk group patch building block 623). The particular output port which is activated is based on the type of response seen during the execution of the block. In the preferred embodiment, the Error1 port is activated as a result of a fundamental error requiring intervention on the part of a console operator; an example is the use of a talk group ID that was valid at creation time is no longer valid at execution time. Also in the preferred embodiment, the Error2 port is activated either when there is an unresolved contention for communication system resources, or there is a request to access a currently unavailable resource.

Figure 9:
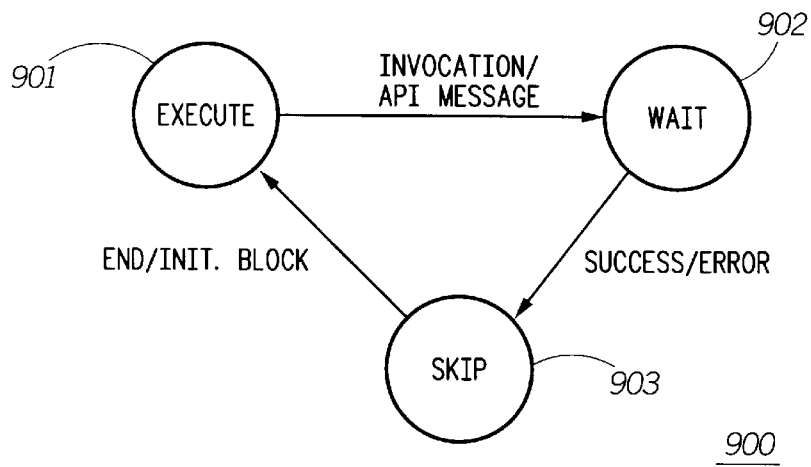
FIG. 9 illustrates a state transition diagram corresponding to a service building block in accordance with the present invention.

The creation of a service within the programming area 602 results in the creation of both an executable as well as an overall behavioral model as represented by a finite state machine. The overall service state machine model is influenced by the service designer's selections of tie type of state behavior that is desired for each of the non-terminator building blocks 605–608 and 611 included in the programming area 602. As shown below in Table 1 relative to the example of FIG. 6, and as illustrated in FIG. 9 in general, the allowed states for blocks include an EXECUTE state 901, a WAIT state 902, and a SKIP state 903. SIBs either initialized to an EXECUTE state or transitioning to an EXECUTE state during execution will execute their service logic upon invocation, e.g., the first talk group patch building block 623 sends an "AddPatchMember" API message when it is invoked. SIBs either initialized to a WAIT state or transitioning to a WAIT state during execution will remain in this state until an expected response is received and a terminal port is activated based on the type of response, Success/Status, Error1 or Error2, e.g., the first talk group patch building block 623 receives an "AddPatchMemberStatus" API message that matches the talk group and patch group numbers sent from an EXECUTE state. SIBs either initialized to a SKIP state or transitioning to an SKIP state during execution will become passive in that they essentially become a router of API messages to all the blocks connected to the active output port.

TABLE 1

| Building Block Name | ITU-T SIB Type | Default Building Block State |
|---|---|---|
| START | Algorithm | Skip |
| Emergency Alarm | Compare | Wait |
| END | Algorithm | Skip |
| EXTERNAL | Algorithm | WAIT |
| Patch, Auxiliary I/O, Call Alert | Algorithm | Execute |

The present invention provides for different types of linkages between SIBs. In particular, the invocation of linked SIBs may either force the re-execution of a linked SIB upon invocation, or skip the execution of a linked SIB if it was previously executed at least once. Additionally, the present invention provides different types of overall service termination. In particular, a "ruthless termination" of a service instance is forced when the service logic activates a particular output link, executes a particular building block, such as the EXTERNAL building block, 611, and returns all building blocks to their default state, waiting for another external stimulus. A "polite termination" of a service instance occurs when none of the SIBs comprising the service are active, i.e., waiting for a response. That is, the service is terminated if and only if an END building block is reached in the logic rules and if all SIBs have finished execution.

Forcing a ruthless termination of any other service(s) is useful when two services have been deployed together; e.g., the first service assembles a set of resources (patch talk groups, activate aux I/Os); and the second service releases the resources (unpatches talk groups, deactivates aux I/Os). In this case the last service to execute will terminate its counterpart service by activating a particular link between two building blocks and executing a particular building block, such as the EXTERNAL building block 622.

The following is an explanation of how the logic program rules created in accordance with the example of FIG. 6 are used to invoke the service in a wireless communication system. As described above, the service is made available to authorized service execution environments. Assuming that the service has been provided to such an authorized service execution environment, each SIB shown has its default state parameter initialized depending upon its type as shown in Table 1. An instance of the service is invoked in the service execution environment upon receipt of a stimulus (in this case, an emergency alarm message) from a unit associated with a specified talk group. This stimulus is passed by a data structure associated via the START building block 620 to the input terminal 640 of emergency alarm building block 621. That is, each message received by the CDI API will be delivered to the SIBs that are linked to the START building block 620; in this case, the emergency alarm building block 621. In accordance with the logic depicted in FIG. 7, the emergency alarm building block 621 will analyze data fields in the API messages. If "MSG_ID" (the identification field from the API message) does not match "EMERG_ID" (the MSG_ID expected by the emergency alarm building block 621), then the EMERG-SIB remains in a WAIT state as initialized. If the first comparison is successful, then a check is made to verify that the field "MSG_STS" (from the API message) matches the expected value "RADIO_EM" (the status entered at service editing time for the emergency alarm building block 621). If those fields do not match, then the emergency alarm building block 621 remains in a WAIT state. If the second comparison is successful, then a check is made to verify that the field "MSG_TLK" (from the API message) matches the expected value "FILE_TLK" (the talk group entered during service editing for the emergency alarm building block 621). It the fields do not match, then the emergency alarm building block 621 remains in the WAIT state. Otherwise, the emergency alarm Building block 621 will transition to a SKIP state.

Once the emergency alarm building block 621 changes state, it signals all the SIBs connected to its SUCCESS output terminal port. During service execution, it is always the responsibility of the presently-executing SIB to check the state of the next SIBs "to be called" by the active output port, and to determine the type of links (ruthless and/or polite) that are connected to the active (SUCCESS port, in this case). Per FIG. 6, three SIBs are signaled next: an EXTERNAL building block 622, a first talk group patch building block 623, and an auxiliary I/O building block 624. The EXTERNAL building block 622 is not constructable by a service designer, but rather is made available in the palette 601 to a service designer. Similar to other building blocks, the EXTERNAL building block 622 is configured via a dialog box similar to the one shown in FIG. 8. Such a dialog box would show a list of available service chains. The designer would select the chain desired to be terminated and close the dialog box, completing the specification of this component.

As described above, each link connecting SIBs can be one of the two types: ruthless or polite. In FIG. 6, ruthless termination links are depicted as dashed lines linking building blocks and polite termination links are depicted with solid lines linking building blocks. The link identified by reference numeral 651 connecting the emergency alarm building block 621 to the EXTERNAL building block 622 is a ruthless termination link. As a result, the EXTERNAL building block 622 will be forced to execute and de-invoke the service represented by the EXTERNAL building block 622 unconditionally. Furthermore, the EXTERNAL building block 622 will then transition to a SKIP state.

The state transitions associated with this execution of EXTERNAL building block 622 can also be explained by reference to FIG. 9. Block 622 was initialized as being in a WAIT state, 902, and was waiting for specific data to cause it to execute. Once it is signaled or triggered via the output (SUCCESS) port of block 621 and the link 651, it executes its logic and transitions (the arrow labeled "SUCCESS/ ERROR" in FIG. 9) to a SKIP state. This arrow indicates that a state transition occurs if either the SUCCESS or the Error1 or Error2 port is used. The module's execution is bypassed; it will not re-execute until it receives an appropriate API message.

The link identified by reference numeral 652 connecting the emergency alarm building block 621 to the first talk group patch building block 623 is a polite termination link. Given that the default state for the first talk group patch building block 623 is EXECUTE, the first talk group patch building block 623 will execute its logic as soon as a SUCCESS signal is available from the emergency alarm building block 621. The logic for the first talk group patch building block 623 (i.e., the configurable software modules corresponding to that building block and configured in accordance with the logic program rules), in this example, includes sending an API message with instructions to add the specified talk group to the specified patch group number (the process of "patching" talk groups is well known in the art). Recall that this information was entered at service editing time for the first talk croup patch building block 623.

The state transitions associated with the above executions of blocks 621 and 623 can also be explained by reference to FIG. 9. As stated above, since the default state for the first talk group patch building block 623 is EXECUTE, the service logic transitions to state 901 and executes the logic associated with the API message. Then the logic transitions to a WAIT state, 902, and waits for the receipt of a particular API response message. Per FIG. 7, once this particular API message is received, it may result in either a SUCCESS or Error1 or Error2 event.

The link identified by reference numeral 653 connecting the emergency alarm building block 621 to the auxiliary I/O building block 624 is a polite termination link. Given that the default state for the auxiliary I/O building block 624 is EXECUTE, the auxiliary I/O building block 624 will execute its logic as soon as a SUCCESS signal is available from the emergency alarm building block 621. The logic for the auxiliary I/O building block 624, in this example, causes an API message to be sent with instructions to activate the specified AUXIO ID (i.e., to turn on the appropriate beacon, etc.). Recall that this information was entered at service editing time for the auxiliary I/O building block 624. The auxiliary I/O building block 624 will then transition to a WAIT state as described above. Recall from Service Requirement 1 above, which states that: "if, during run-time, an exception condition is encountered that prevents activation of the light, continue with other remaining service tasks". Since no exception or error processing was required for the beacon light, the output port and all Error ports of block 624 were connected to the End block SIB, 629, via polite links, at service creation time.

At this point in the execution of the service, all the received API messages are delivered to the emergency alarm building block 621, currently in the SKIP state. Likewise, the EXTERNAL building block 622 is in a SKIP state with no other SIBs connected to it. This means that if the EXTERNAL building block 622 does not receive an appropriate API message, its execution is bypassed, and it remains in a SKIP state. Recall that the first talk group patch building block 623 sends an "AddPatchMember" API message when it is invoked and, having transitioned to a WAIT state will remain in this state until the expected response (an "AddPatchMemberStatus" API message that matches the talk group and patch group numbers) is received. If the expected response is received, the Success terminal port 641 becomes the active output for the first talk group patch building block 623, and the second talk group patch building block 625 and the third talk group patch building block 626 are signaled.

If, on the other hand, an error response (as determined by the underlying logic) is received, either the Error1 or Error2 terminal port becomes the active output port for the first talk group patch building block 623, and the building blocks connected to either the Error1 or Error2 terminal port are signaled. Additionally, the first talk group patch building block 623 transitions to the SKIP state, as described above. As shown, both error terminal ports for the first talk group patch building block 623 are connected to an END building block 630. Note that the links to the END building block 630 are of the ruthless termination type. As a result, the entire service is ended and all of the building blocks 621–633 are set to their respective default states.

The logic underlying both the second talk group patch building block 625 and the third talk group patch building block 626 is similar to that of that of the first talk group patch building block 623. Since the second talk group patch building block 625 and the third talk group patch building block 626 are signaled at virtually the same time, each sends an API request and each transitions to a WAIT state, as described above. If execution of the second talk group patch building block 625 results in the reception of one of the possible error responses, either the Error1 or Error2 terminal ports will become active, and the second talk group patch building block 625 will signal the building blocks connected to its Error1 or Error2 terminal port; in this case, an END building block 633. Similar behavior may be exhibited by the third talk group patch building block 626, with its Error1 and Error2 terminal ports linked to an END building block 631.

For successful executions of the second talk group patch building block 625 and the third talk group patch building block 626, the first call alert building block 627 will be signaled twice. When the first call alert building block 627 is signaled for the first time, the block is in the EXECUTE stale (as was initialized during service creation), it will run its logic and transition immediately to a WAIT state. Prior to signaling the first call alert block 627 a second time, a check is always made by the calling SIB (in this case either block 625 or block 626, whichever one having the active output port). It will ensure that the first call alert block 627 has not been signaled previously by determining that block 627 is not in a WAIT state, implying that the call alert has already been performed. Assuming that the first call alert building block 627 executes successfully, the service has been completed and terminates, politely, with the END building block 633.

The second call alert building block 628 is invoked if and only if an error occurs during the execution of the first call alert building block 627. In terms of the end-user service, this indicates that the unit specified in the first call alert building block 627 could not be alerted. In this exception case, an attempt is made to alert the unit specified in the second call alert building block 628. Whether or not the unit specified in the second call alert building block 628 is successfully alerted, the overall service instance ends with the END building block 632.

A comparison of the previous discussion regarding FIG. 6 with Requirements 1–3 described above illustrates that the service has been implemented using the logic program rules created in accordance with the present invention. As noted before, the service described herein is intended to be illustrative only, and it is understood that other service may be similarly implemented using the method and apparatus of the present invention.

Additionally, the present invention allows for the execution environment to accept "incomplete" service logic from the creation environment and to subsequently configure information such as talk group number information, thereby completing the service logic rule specification. After all necessary information is added and the logic rules are validated, that the service can be invoked by the execution environment.

The present invention provides a method and apparatus for implementing a service in a wireless communication system. Within a console or stand-alone computer, a service creation environment is provided that allows for the rapid design of services that are responsive to events within the wireless communication system. As a result, logic program rules can be quickly provided to authorized service execution environments, preferably residing within a console. Using the logic program rules, the service may be subsequently implemented throughout the wireless communication system. Additionally, "incomplete" services may be designed such that customization of services may occur at the separate service execution environments.

Although the present invention has been described with reference to certain preferred embodiments, numerous modifications and variations can be made by those skilled in the art without departing from the novel spirit and scope of the present invention.

We claim:

1. A method for implementing a service in a wireless communication system, the method comprising steps of:

providing, in a service creation environment, a plurality of service building blocks;

creating logic program rules representative of the service comprising at least one service building block of the plurality of service building blocks and identification of an authorized service execution environment;

determining that an identification of a service execution environment matches the identification of the authorized service execution environment, wherein the service execution environment comprises a plurality of configurable software modules;

providing the logic program rules to the service execution environment; and executing, within the service execution environment, at least one of the plurality of configurable software modules according to the logic program rules such that the service is implemented within the wireless communication system.

2. The method of claim 1, further comprising the step of providing the plurality of service building blocks, wherein the wireless communication system comprises at least one console, and wherein a first console of the at least one console comprises the service creation environment.

3. The method of claim 2, wherein the identification of the authorized service execution environment comprise an identification of the at least one console.

4. The method of claim 1, further comprising the step of providing the plurality of service building blocks, wherein the wireless communication system comprises a stand-alone computer, and wherein the stand-alone computer comprises the service creation environment.

5. The method of claim 4, wherein the wireless communication system comprises at least one console, and wherein the identification of the authorized service execution environment comprise an identification of the at least one console.

6. The method of claim 1, the step of creating the logic program rules further comprising steps of:

for each of the at least one service building block:

displaying a first set of configuration parameters when the service building block is displayed within a service palette; and configuring a second set of configuration parameters when the service building block is displayed within a programming area.

7. The method of claim 1, the step of creating the logic program rules further comprising a step of:

for any of the at least one service building block:

configuring the service building block such that a transition from a WAIT state to a SKIP state and then to an EXECUTE state causes input data to be passed, without further processing, to an output.

8. The method of claim 1, further comprising the step of creating the logic program ruins, wnerein the logic program rules are responsive to any of: at least one wireless unit identification, at least one wireless group identification, at least one wireless status indication, and a wireless message.

9. The method of claim 1, the step of providing the logic program rules to the service execution environment further comprising a step of automatically providing the logic program rules to the authorized service execution environment.

10. The method of claim 1, the step of providing the logic program rules to the service execution environment further comprising steps of:

notifying the authorized service execution environment regarding the logic program rules;

receiving a request for the logic program rules from the service execution environment; and sending the logic program rules to the service execution environment.

11. A method for implementing a service in a wireless communication system, the method comprising steps of:

providing, in a service creation environment, a plurality of service building blocks;

creating logic program rules representative of the service comprising at least one service building block and an identification of an authorized service execution environment, wherein a first set of configuration parameters but not a second set of configuration parameters for each of the at least one building block are configured;

determining that an identification of a service execution environment matches the identification of the authorized service execution environment, the service execution environment comprising a plurality of configurable software modules;

providing the logic program rules to the service execution environment;

configuring the second set of configuration parameters within the service execution environment; and executing, within the service execution environment, at least one of the plurality of configurable software modules according to the logic program rules such that the service is implemented within the wireless communication system.

12. The method of claim 11, further comprising the step of providing the plurality of service building blocks, wherein the wireless communication system comprises at least one console, and wherein a first console of the at least one console comprises the service creation environment.

13. The method of claim 12, wherein the identfication of the authorized service execution environment comprise an identification of the at least one console.

14. The method of claim 11, further comprising the step of providing the plurality of service building blocks, wherein the wireless communication system comprises a stand-alone computer, and wherein the stand-alone computer comprises the service creation environment.

15. The method of claim 14, wherein the wireless communication system comprises at least one console, and wherein the identification of the authorized service creation environment comprise an identification of the at least one console.

16. The method of claim 11, the step of creating the logic program rules further comprising a step of:

for any of the at least one service building block:
configuring the service building block such that a transition WAIT state to a SKIP state and then to an EXECUTE state causes input data to be passed, without further processing, to an output.

17. The method of claim 11, further comprising the step of creating the logic program rules, wherein the logic program rules are responsive to any of: at least one wireless unit identification, at least one wireless group identification, at least one wireless status indication, and a wireless message.

18. The method of claim 11, the step of providing the logic program rules to the service execution environment further comprising a step of automatically providing the logic program rules to the authorized service execution environment.

19. The method of claim 11, the step of providing the logic program rules to the service execution environment further comprising steps of:

notifying the authorized service execution environment regarding the logic program rules;

receiving a request for the logic program rules from the service execution environment; and sending the logic program rules to the service execution environment.

20. An apparatus for implementing a service in a wireless communication system, the apparatus comprising:

a service creation environment for creating logic program rules representative of the service, the logic program rules comprising at least one service building block and an identification of an authorized service execution environment; and a service execution environment, coupled to the service creation environment and having an identification that matches the identification of the authorized service execution environment, comprising a plurality of configurable software modules, wherein at least one of the plurality of configurable software modules is executed according to the logic program rules such that the service is implemented in the wireless communication system.

21. The apparatus of claim 20, wherein the service creation environment is implemented in a console.

22. The apparatus of claim 21, wherein the service execution environment is implemented in the console.

23. The apparatus of claim 21, wherein the service execution environment is implemented in another console.

24. The apparatus of claim 20, wherein the service creation environment is implemented in a stand-alone computer.

25. The apparatus of claim 24, wherein the service execution environment is implemented in a console.

26. The apparatus of claim 20, the service creation environment further comprising a graphical user interface.

* * * * *